US010530096B1

(12) United States Patent
Mahadik et al.

(10) Patent No.: US 10,530,096 B1
(45) Date of Patent: Jan. 7, 2020

(54) VISUAL CONNECTOR LOCKING SYSTEM

(71) Applicant: Valeo North America, Inc., Troy, MI (US)

(72) Inventors: Amogh Mahadik, Seymour, IN (US); Don Lingerfelt, Marysville, OH (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/022,047

(22) Filed: Jun. 28, 2018

(51) Int. Cl.
*H01R 13/60* (2006.01)
*H01R 13/641* (2006.01)
*H01R 13/627* (2006.01)
*B60R 16/02* (2006.01)

(52) U.S. Cl.
CPC ....... *H01R 13/641* (2013.01); *H01R 13/6272* (2013.01); *B60R 16/0215* (2013.01); *H01R 2201/26* (2013.01)

(58) Field of Classification Search
CPC .............. H01R 13/641; H01R 13/6272; H01R 13/5219; B60R 16/0215
USPC ........................................................ 439/145
See application file for complete search history.

(56) References Cited

U.S. PATENT DOCUMENTS

| 10,014,631 | B1* | 7/2018 | Chambly ........... H01R 13/5219 |
| 2001/0031565 | A1 | 10/2001 | Sakiyama |
| 2005/0085139 | A1 | 4/2005 | Copper et al. |
| 2015/0155664 | A1 | 6/2015 | Lu et al. |

FOREIGN PATENT DOCUMENTS

| KR | 1998-0006638 A | 3/1898 |
| KR | 1998-078628 A | 11/1998 |

* cited by examiner

*Primary Examiner* — Jean F Duverne
(74) *Attorney, Agent, or Firm* — Oblon, McClelland, Maier & Neustadt, L.L.P.

(57) ABSTRACT

An electrical connector assembly for an automotive subassembly having an enclosure is described. The electrical connector assembly includes a female electrical connector mounted to the enclosure and having a tight space between a wall of the female electrical connector and an adjacent inside surface of the enclosure. A male electrical connector has a spring-action lock that locks the male electrical connector by way of a single locking tab that pops out to project through a slot in the wall of the female electrical connector when the male electrical connector is fully inserted into the female electrical connector. A color of the wall of the female electrical connector is a dark color and a color of the locking tab is a bright color such that a secure connection between the male electrical connector and the female electrical connector is indicated by appearance of the projected locking tab within the tight space.

8 Claims, 6 Drawing Sheets

VISUAL CONNECTOR LOCKING SYSTEM

BACKGROUND

Field of Disclosure

The present disclosure relates generally to connector locking system, for example, a connector that shows a visual indication that the connection is locked and secured during assembly in a tightly spaced automotive subassembly.

Description of the Related Art

Automobile vehicles contain numerous electrical connectors in which a male electrical connector at the end of a wire, pair of wires, or wiring harness is inserted into a female electrical connector mounted inside or in an opening of a panel of an automotive subassembly. Sometimes the electrical connectors are located within spaces that are difficult to reach, may have limited visibility, and may not be accessible once a connection is made. For example, the connector typically goes in the internal connection for a headlamp; the connector connecting the main wire harness of the headlamp to the wire harness from the PCB board. Also, wires are connected to the rear of each of female connector and male connector. The connection might be of a sub system connecting to the main system by the like for example a PCB connecting to the main wire harness inside of a headlamp. In this case one set of wires would be coming from the PCB and the other set from the main wire harness and would get connected by the connector. FIG. 1 is a diagram showing an example of a tightly spaced enclosure containing a female electrical connector. As shown in FIG. 1, a female electrical connector 101 may be set back by a distance D from the entrance to the enclosure 103 and a clearance C to an inside surface of the enclosure 103 in the subassembly may be only that necessary to accommodate the female electrical connector 101. For example, the clearance C may be only a few centimeters, in the range of 2 to 5 centimeters depending on the type of automotive subassembly. The female electrical connector 101 may be set back by a distance D that is sufficient to ensure room for mounting, in this case the auxiliary power outlet. Once connected, the wiring plug is not intended to be accessed. However, such electrical connectors may not be fully secured when connected; resulting in a disconnection after a vehicle has been shipped or sold. In these cases, the vehicle may have to be returned due to electrical failure of connection of the PCB assembly and main wire harness. One solution to insuring that a male connector is fully inserted into a female connector has been, as shown in FIG. 2, to include a structure 211 in the male connector 201 and/or the female connector 203 that causes a clicking sound to occur when the male connector 201 is fully inserted into the female connector 203. However, the structure 211 that causes the clicking sound does not itself insure a sufficient connection. Also, in the manufacturing environment where the connection may be performed, surrounding noise may be such that a person that is inserting the male connector cannot actually hear the clicking sound, or may mistakenly believe that the clicking sound occurred.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
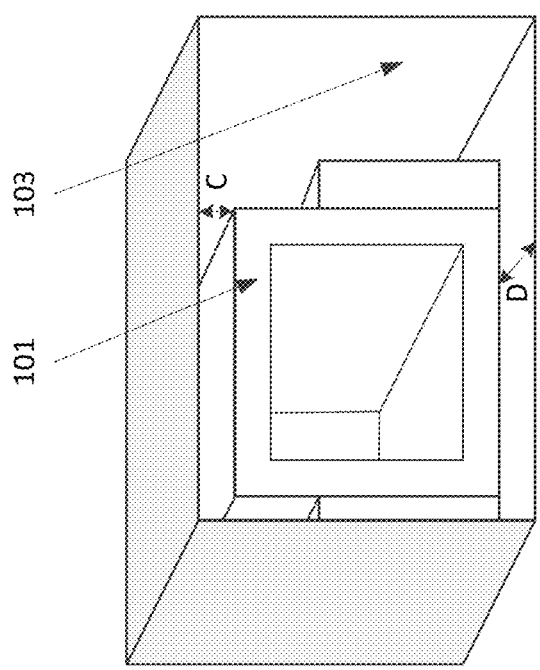
FIG. 1 is a diagram showing an example of a tight space enclosing a female electrical connector.
Figure 2:
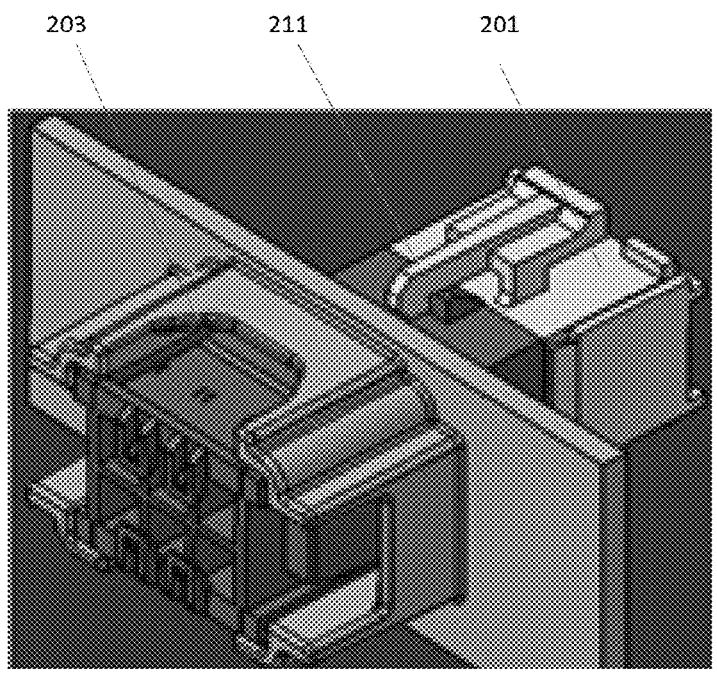
FIG. 2 is a perspective view of a conventional electrical connector assembly.

Referring now to the drawings, wherein like reference numerals designate identical or corresponding parts throughout several views, the following description relates to a lockable electrical connector assembly, and in particular a male electrical connector having a spring-action lock that locks the male electrical connector by way of a single locking tab that pops up to project through a slot in a wall of the female electrical connector when the male electrical connector is fully inserted into the female electrical connector. The color of the locking tab is distinguished from the color of the female electrical connector such that a secure connection is easily observed. This lockable connector is particularly suited for connectors that are mounted on automotive assemblies in a tightly spaced enclosure. The lockable connector is particularly suited for connections that are not intended to be later disconnected.

Figure 3:
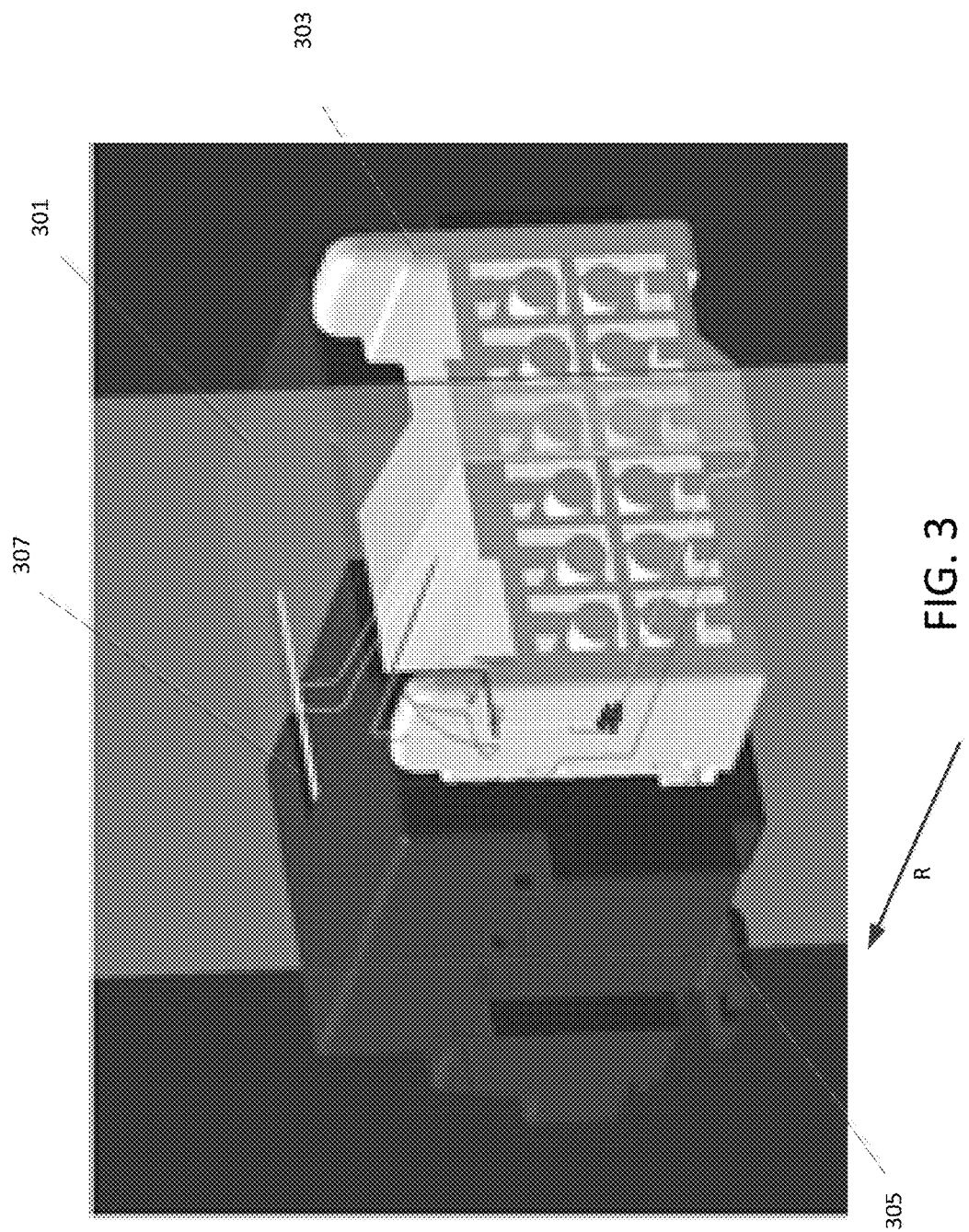
FIG. 3 is a perspective view of an electrical connector assembly in which a male electrical connector is being inserted into a female electrical connector according to an exemplary aspect of the disclosure.

FIG. 3 is a perspective view of an electrical connector assembly according to an exemplary aspect of the disclosure. The electrical connector assembly is shown in a state in which a male electrical connector is being inserted into a female electrical connector in an insertion direction R. The male electrical connector 303 is to be plugged into a female electrical connector 301, which is mounted, for example, via a mounting slot 305 to an enclosure in an automotive subassembly housing. The female electrical connector 301 includes an opening slot 307 in an upper wall. The electrical connection made by the connector assembly may be, for example, a connection for a 12V auxiliary power outlet. In some embodiments, the power outlet may be a port, such as a USB port, that may be used for charging electric appliances, and/or connection to internal wiring of a vehicle.

The male and female components of the electrical connector assembly may each be a molded plastic. Common plastic materials for electrical connectors include thermoplastic polyester resins, polyamide, polyethylene and polypropylene. It is preferable that the plastic material has stiffness and color retention. The male and female components of the electrical connector assembly are preferably made of visually distinct colors. In some embodiments, the female electrical connector 301 may be made of a dark color, while the male electrical connector may be made of a bright color. For example, the female electrical connector 301 may be made of a black colored plastic, while the male electrical connector 303 may be made of a white colored plastic. Other dark colors are possible for the female electrical connector, such as a dark blue, dark green, dark purple, or dark red. Bright colors that may be used as the color of the male electrical connector include, but are not limited to, bright yellow, bright orange, bright green. In some embodiments, the male electrical connector is made of a metallic color or may include a color infused with a phosphor.

Figure 4:
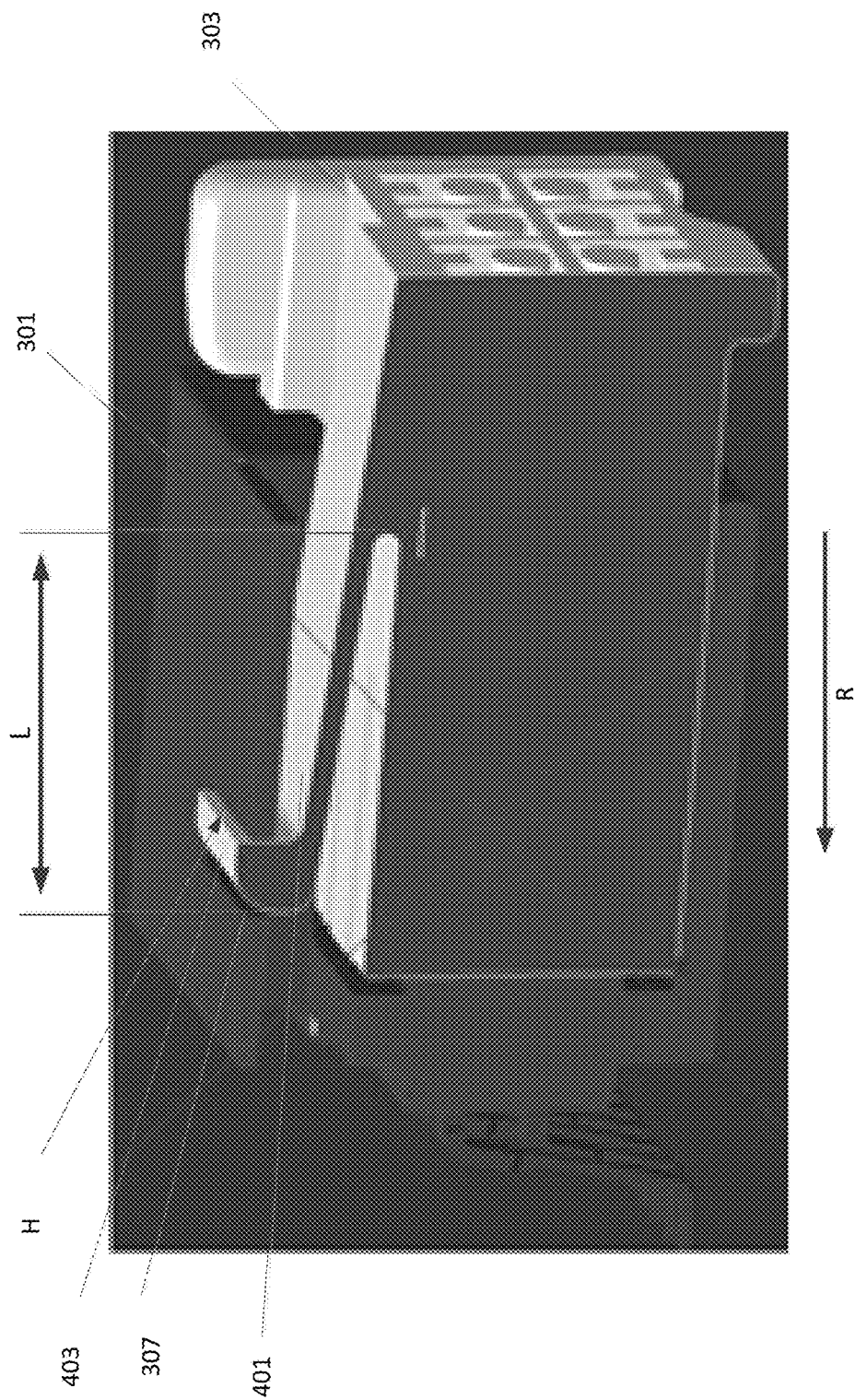
FIG. 4 is a cut-out view of the male electrical connector in an inserted position according to an exemplary aspect of the disclosure.

FIG. 4 is a cut-out view of the electrical connector assembly in an inserted position according to an exemplary aspect of the disclosure. The male electrical connector 303 includes a spring-action portion 401. The spring-action portion 401 performs a spring action such that a locking tab 403 pops up when a full connection is made. It is preferred that the length L of the spring-action portion 401 be of a length that the spring action force is sufficient for the locking tab 403 to pop into the slot 307. When a full connection is made, the locking tab 403 projects by a height H above the outer surface of the female electrical connector 301. In one embodiment, the locking tab 403 has a flat surface on the side that is opposite to the insertion direction R and has a curved shape on the side facing the insertion direction R. In another embodiment, the locking tab 403 may include a hook shape on the side that is opposite to the insertion direction R in order to partially overlap the upper surface of the female electrical connector and ensure that the lock action by the locking tab 403 cannot be undone. In some embodiments, the Length L is: 5.5-8 mm, and Height H: 0.1-0.3 mm.

Figure 5:
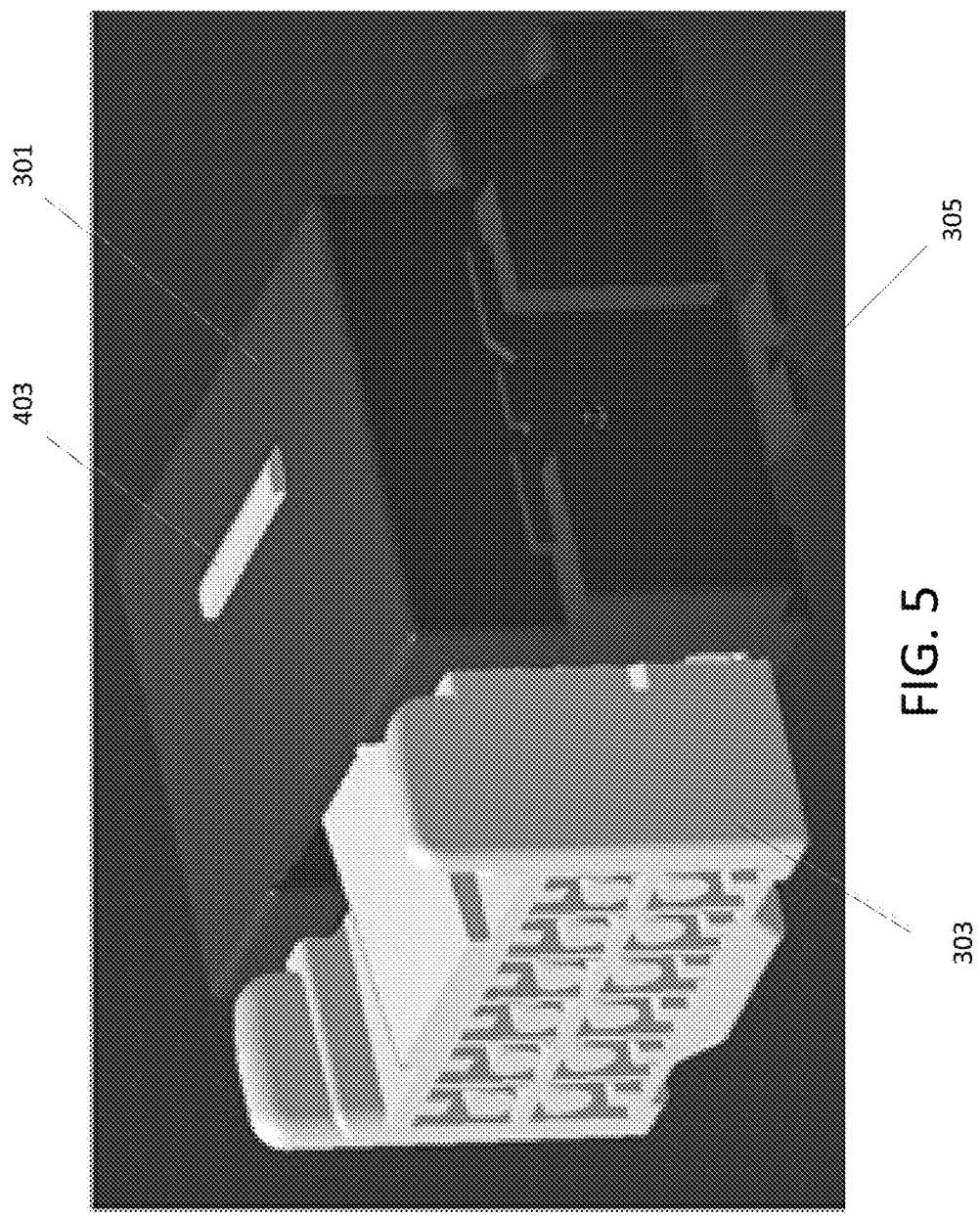
FIG. 5 is a perspective view of a male electrical connector in the fully inserted position according to an exemplary aspect of the disclosure.

FIG. 5 is a perspective view of an electrical connector assembly in the fully inserted position according to an exemplary aspect of the disclosure. As shown in FIG. 5, the locking tab 403 is clearly visible when the electrical connector assembly is fully connected. In one embodiment, the height H of the locking tab 403 above the outer surface of the wall of the female electrical connector is at least 0.1 mm to ensure visibility when viewed along the insertion direction axis R. Also, the visibility of the locking tab 403 ensures that the connection is secured.

Figure 6:
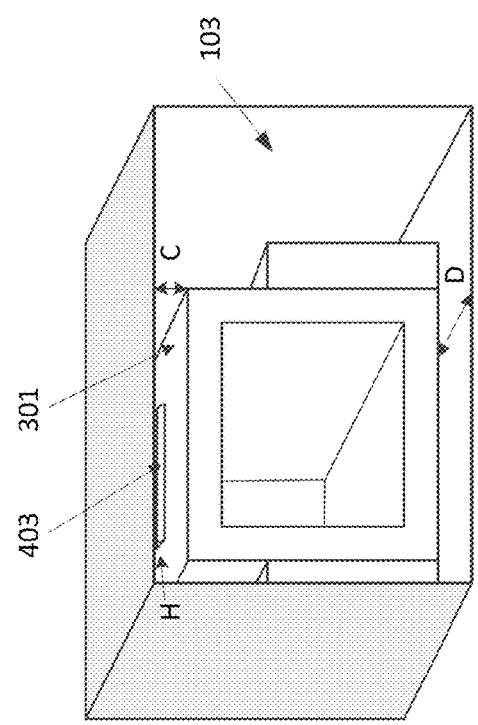
FIG. 6 is a diagram showing an example of a tight space enclosing a female electrical connector and the position of a visible locking tab.

FIG. 6 is a diagram showing an example of an enclosure having a tight space enclosing a female electrical connector and the position of a visible locking tab. As can be seen in FIG. 6, the locking tab 403 (shown without the rest of the male electrical connector for purposes of simplicity) projects above the upper surface of the female electrical connector 301 by a height H that is sufficient to be visible in the enclosure 103, where the female electrical connector 301 has a clearance C and is set back by a distance D within the enclosure 103.

Although the example in FIG. 6 shows the female electrical connector 201 mounted at a lower surface of a lower wall of the connector and the slot through which the locking tab 303 is projected is at an upper wall, the disclosure is not so limited. For example, the female electrical connector 301 may be mounted at an upper surface of an upper wall of the connector such that the slot is located at a lower wall of the connector. Alternatively, the female electrical connector 301 may be mounted at a side surface. In one embodiment, the orientation of the female electrical connector 301 is the inverse from that shown in FIG. 5 such that the lower surface having mounting slot 305 is mounted to an upper inner surface of an enclosure 103.

It is preferred that the male electrical connector 303 include only one locking tab 403 so that a visual inspection of the lock state of the connector assembly can be readily observed from just one direction.

Features of a three-dimensional structure are based on the target automotive subassembly that the structure is to be installed. In particular, the number and location of bending portions and the number and location of branches is determined by the target automotive subassembly. By assembling the three-dimensional structure of a wire-harness in advance, the work involved in installing the wire-harness is greatly simplified. Also, the thin plastic sheets that are wrapped around portions of the wire-harness provide stiffness for holding the three-dimensional structure of the wire-harness, and serve to isolate the wires from the automotive subassembly, and thus prevent pinching and abrasion.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An electrical connector assembly for an automotive subassembly having an enclosure, the electrical connector assembly comprising:
    a female electrical connector mounted to the enclosure and having a clearance between a wall of the female electrical connector and an adjacent inside surface of the enclosure in the range of 1 to 3 cm;
    a male electrical connector having a spring-action lock that locks the male electrical connector by way of a single locking tab that pops out to project through a slot in the wall of the female electrical connector when the male electrical connector is fully inserted into the female electrical connector; and
    a color of the wall of the female electrical connector is a dark color and a color of the locking tab is a bright color such that a secure connection between the male electrical connector and the female electrical connector is indicated by appearance of the projected locking tab,
    wherein the male electrical connector includes a spring-action portion having a fixed end and a free end, where the free end includes the locking tab, and
    wherein the length of the spring-action portion is such that the spring force is sufficient to push the locking tab through the slot.

2. The electrical connector assembly of claim 1, wherein the locking tab projects above an outer surface of the wall of the female electrical connector by a height of at least 1 cm.

3. The electrical connector assembly of claim 1, wherein the color of the wall of the female electrical connector is black and a color of the locking tab is white.

4. The electrical connector assembly of claim 1, wherein the color of the wall of the female electrical connector is dark brown and a color of the locking tab is white.

5. The electrical connector assembly of claim 1, wherein the color of the wall of the female electrical connector is dark blue and a color of the locking tab is white.

6. The electrical connector assembly of claim 1, wherein the male electrical connector is electrically connected to an auxiliary power outlet mounted within the automotive subassembly.

7. An electrical connector assembly for an automotive subassembly having an enclosure, the electrical connector assembly comprising:
   a female electrical connector mounted to the enclosure and having a clearance between a wall of the female electrical connector and an adjacent inside surface of the enclosure in the range of 1 to 3 cm;
   a male electrical connector having a spring-action lock that locks the male electrical connector by way of a single locking tab that pops out to project through a slot in the wall of the female electrical connector when the male electrical connector is fully inserted into the female electrical connector; and
   a color of the wall of the female electrical connector is a dark color and a color of the locking tab is a bright color such that a secure connection between the male electrical connector and the female electrical connector is indicated by appearance of the projected locking tab,
   wherein the wall of the female connector assembly is an upper wall, and
   wherein the spring-action lock locks the male electrical connector when the single locking tab pops up to project through the slot in the upper wall of the female electrical connector and the male electrical connector is fully inserted into the female electrical connector.

8. An electrical connector assembly for an automotive subassembly having an enclosure, the electrical connector assembly comprising:
   a female electrical connector mounted to the enclosure and having a clearance between a wall of the female electrical connector and an adjacent inside surface of the enclosure in the range of 1 to 3 cm;
   a male electrical connector having a spring-action lock that locks the male electrical connector by way of a single locking tab that pops out to project through a slot in the wall of the female electrical connector when the male electrical connector is fully inserted into the female electrical connector; and
   a color of the wall of the female electrical connector is a dark color and a color of the locking tab is a bright color such that a secure connection between the male electrical connector and the female electrical connector is indicated by appearance of the projected locking tab,
   wherein the wall of the female connector assembly is a lower wall, and
   wherein the spring-action lock locks the male electrical connector when the single locking tab pops downward to project through the slot in the lower wall of the female electrical connector and the male electrical connector is fully inserted into the female electrical connector.

\* \* \* \* \*